United States Patent [19]

Tomita

[11] Patent Number: 5,113,370
[45] Date of Patent: May 12, 1992

[54] INSTRUCTION BUFFER CONTROL SYSTEM USING BUFFER PARTITIONS AND SELECTIVE INSTRUCTION REPLACEMENT FOR PROCESSING LARGE INSTRUCTION LOOPS

[75] Inventor: Hiroshi Tomita, Kanagawa, Japan

[73] Assignee: Hitachi, Ltd., Tokyo, Japan

[21] Appl. No.: 289,564

[22] Filed: Dec. 23, 1988

[30] Foreign Application Priority Data

Dec. 25, 1987 [JP] Japan ................ 62-327132

[51] Int. Cl.⁵ .................... G06F 9/312; G06F 9/40
[52] U.S. Cl. .................... 395/375; 364/238.4; 364/239.8; 364/245.5; 364/246.3; 364/261.3; 364/262.1; 364/286; 364/281.3; 364/926.9; 364/926.92; 364/938; 364/946.2; 364/946.8; 364/968; 364/966.4; 364/966.1; 364/946.6; 364/964; 364/DIG. 1; 364/DIG. 2

[58] Field of Search ... 364/200 MS File, 900 MS File

[56] References Cited

U.S. PATENT DOCUMENTS

| | | | |
|---|---|---|---|
| 3,573,854 | 4/1971 | Watson | 364/200 |
| 3,593,306 | 7/1971 | Toy | 364/200 |
| 3,717,850 | 2/1973 | Ghinon | 364/200 |
| 3,736,566 | 5/1973 | Anderson | 364/200 |
| 3,840,861 | 10/1974 | Amdahl | 364/200 |
| 3,928,857 | 12/1975 | Carter | 364/200 |
| 3,949,376 | 4/1976 | Ball | 364/200 |
| 4,095,269 | 6/1978 | Kawabe | 364/200 |
| 4,245,302 | 1/1981 | Amdahl | 364/200 |
| 4,271,480 | 6/1981 | Vinot | 364/900 |
| 4,535,404 | 8/1985 | Shenk | 364/200 |
| 4,554,630 | 11/1985 | Sargent | 364/200 |
| 4,566,063 | 1/1986 | Zolnowsky | 364/200 |
| 4,626,988 | 12/1986 | George | 364/200 |
| 4,635,193 | 1/1987 | Moyer | 364/200 |
| 4,755,935 | 7/1988 | Davis | 364/200 |
| 4,792,892 | 12/1988 | Mary et al. | 364/200 |
| 4,954,947 | 9/1990 | Kariyama | 364/200 |

OTHER PUBLICATIONS

Kai Hwang, et al., *Computer Architecture and Parallel Processing*, McGraw-Hill, 1984, pp. 187–193.

Primary Examiner—Thomas C. Lee
Assistant Examiner—Eric Coleman
Attorney, Agent, or Firm—Fay, Sharpe, Beall, Fagan, Minnich & McKee

[57] ABSTRACT

To attain high execution performance of an information processor by improving hit ratio of an instruction buffer in the processor, a part of instructions comprising a loop of the instruction is allocated into the specified area of the instruction buffer and is not replaced during the execution of the loop of instruction so as to be always hit in fetching, when the size of a loop of instruction is greater than that of the instruction buffer. The other instructions are allocated into the other area and may be replaced.

5 Claims, 2 Drawing Sheets

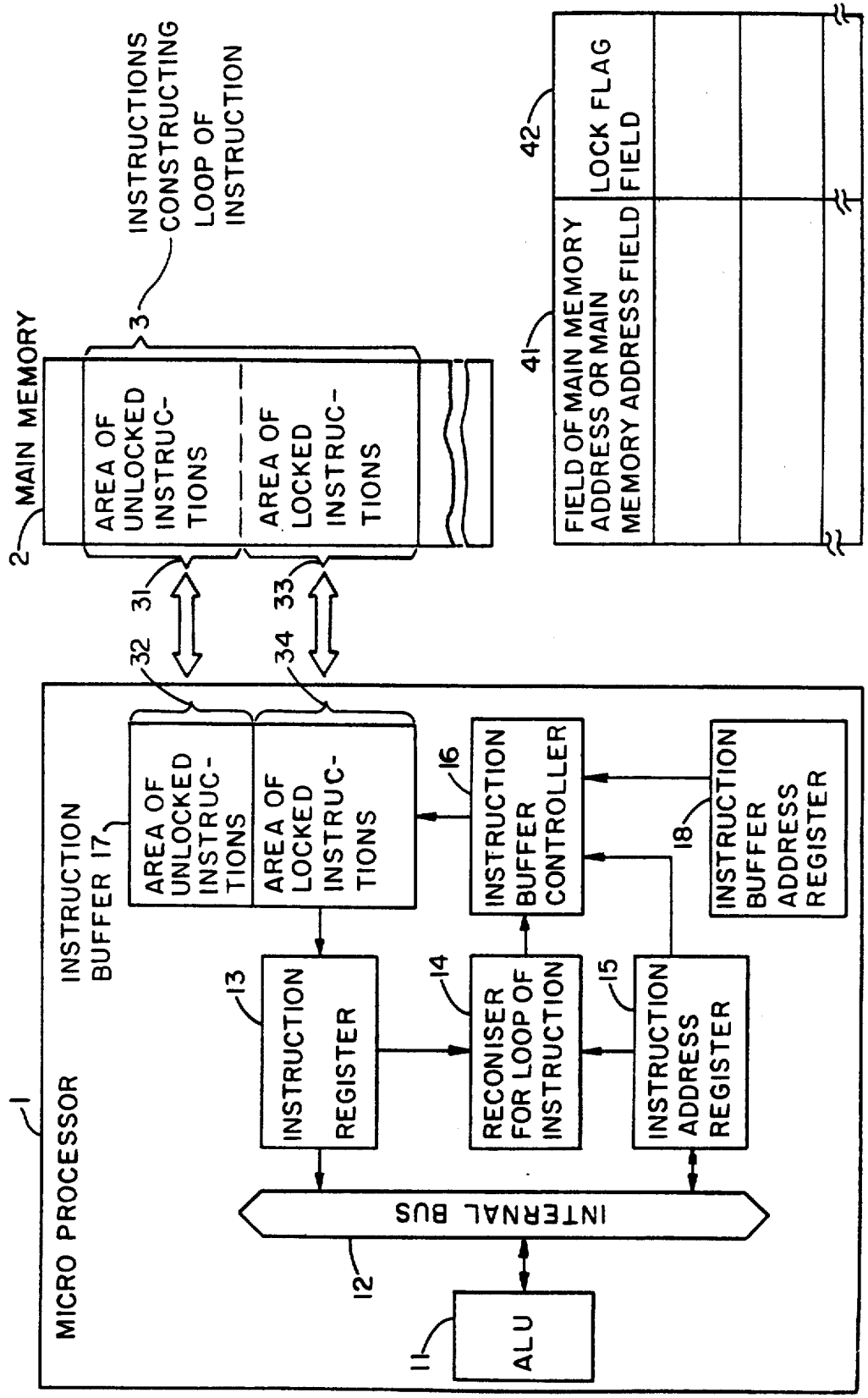

INSTRUCTION BUFFER CONTROL SYSTEM USING BUFFER PARTITIONS AND SELECTIVE INSTRUCTION REPLACEMENT FOR PROCESSING LARGE INSTRUCTION LOOPS

BACKGROUND OF THE INVENTION

The present invention relates to an information processor having an instruction buffer, and particularly to an information processor which is designed to increase the whole processing speed by improving the hit rate of the instruction buffer.

A variety of improvements have been made in the execution control to increase the processing speed of the information processors as described in "Computer Architecture and Parallel Processing" by Kai Hwang et al, 1984 Mcgraw-Hill pp. 187 to 193. In the conventional instruction buffer, it is taught that several instructions among the instruction words in the main memory are stored in advance in a memory of a small capacity for high speed accessing, thereby to reduce the time for reading the instruction words and, hence, to increase the processing speed. In particular, when the loop of instructions capable of totally residing in the instruction buffer is executed repetitively, the especially stored instruction words are not re-executed at the later executions later, thereby making it possible to efficiently increase the speed of processing. The above-mentioned case is referred to as the capture of a loop of instructions.

There is an algorithm (called replacement algorithm) for determining that location in the instruction buffer that stores the next instruction to be executed when it is not in the instruction buffer. In general, such an algorithm employs a method (First In First Out, FIFO) for storing the next instruction at the location of the old instruction in the instruction buffer, or a method (Least Recently Used, LRU) for storing the next instruction at the location of the instruction that was not referred to for the longest period of time.

The probability (hit rate) that the instruction to be executed next is stored in the instruction buffer increases with the increase in the capacity of the instruction buffer, whereby the probability of capture of the loop of instructions increases, too. In the case of a loop of instructions greater than the capacity of the instruction buffer, however, the instructions are expelled from the instruction buffer before they can be executed despite the same instructions being repetitively executed many times. Therefore, the instructions are read out from the main memory before they can be re-executed, and the efficiency decreases significantly. This phenomenon also develops even when the replacement algorithm is FIFO or LRU.

SUMMARY OF THE INVENTION

The object of the present invention is to realize an instruction buffer which maintains a high hit rate and efficiency even when a loop of instructions is greater than the capacity of the instruction buffer.

The above object is achieved by providing a recognizer mechanism for recognizing a loop of instructions, switching the algorithm into a replacement algorithm for minimizing the frequency of replacement of instructions in the loop of instructions during the execution of the instructions in the loop of instructions, and using a conventional replacement algorithm such as FIFO or LRU during the execution of the instructions other than the loop of instructions.

The recognizing mechanism for recognizing the loop of instructions recognizes a jump instruction for loop control out of the instruction set provided by the CPU, and recognizes the instructions between the jump instruction and the instruction at the jumping destination to pertain to the loop of instructions. When the jump instruction for loop control is recognized, a complete loop of instructions can be captured provided the loop of instructions is smaller than the capacity of the instruction buffer. When the loop of instructions is greater than the capacity of the instruction buffer, only a part of the instructions in the instruction buffer is regarded to be an object of replacement, and the other instructions in the loop of instructions in the instruction buffers are excluded from the object of replacement. Therefore, the replaceable instructions are read from the main memory for every execution, but the nonreplaceable instructions exist in the instruction buffer at all times and need not be read out from the main memory. At a moment when the execution of instructions has shifted to outside the loop of instructions, the whole instruction buffer contents are rendered replaceable, so that an ordinary replacement algorithm is assumed.

BRIEF DESCRIPTION OF THE DRAWINGS

FIG. 1 is a diagram illustrating a relationship between the constitution of a microprocessor and a main memory according to an embodiment of the present invention;

FIG. 2 is a diagram of an address correspondence table;

DETAILED DESCRIPTION OF THE PREFERRED EMBODIMENTS

Figure 3:
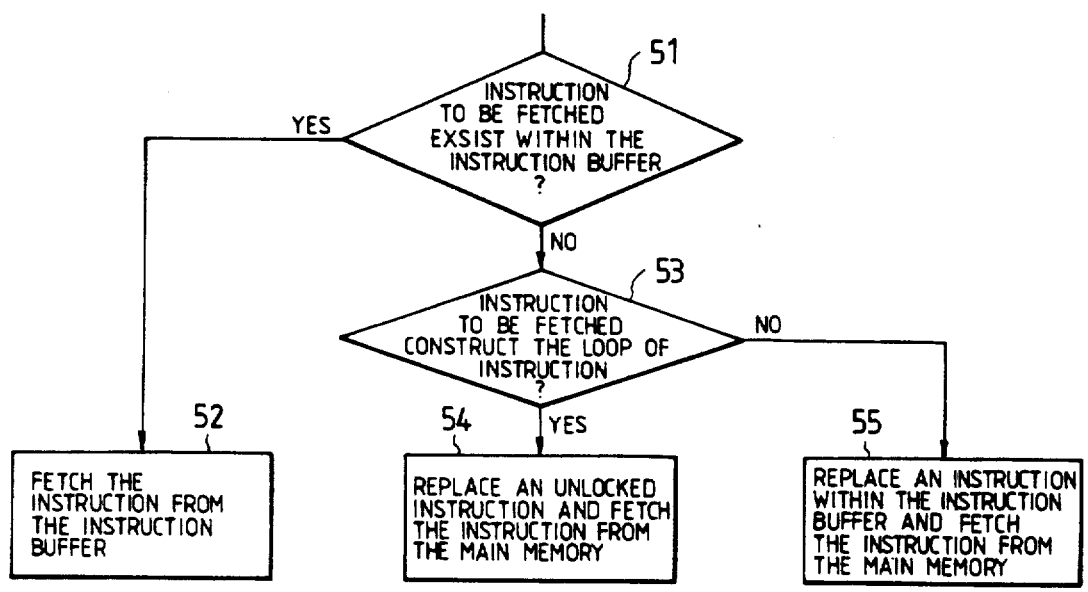
FIG. 3 is a flow chart showing the procedure of processing related to the instruction fetching by the instruction buffer controller.

A microprocessor according to an embodiment of the present invention will now be described in conjunction with FIGS. 1 to 4.

FIG. 1 shows a relationship between the constitution of a microprocessor 1 and a main memory 2. The address of an instruction to be executed by the microprocessor 1 is held by an instruction address register 15 and is handed over to an instruction buffer controller 16 which examines if the instruction has already been fetched in an instruction buffer 17. When the instruction has not been fetched, the instruction buffer controller 16 fetches the instruction from the main memory 2 and transfers it to the instruction register 13. The instruction of the instruction register 13 controls an ALU 11 via an internal bus 12.

An instruction loop recognizer 14 recognizes a loop of instructions when a jump instruction for loop control is loaded in the instruction register 13. The microprocessor provides an SCBcc instruction. An assembler mnemonic of the SCBcc instruction is written as, SCBcc Rn, <label>

The SCBcc instruction is the one which subtracts 1 from the register Rn when the cc condition is false and which allows a jump <label> when the subtracted result is other than −1; i.e., the SCBcc instruction is a machine instruction that corresponds to the UNTIL loop in a high level language and a loop with counters. The instruction loop recognizer 14 recognizes the SCBcc instruction, recognizes the instructions between the SCBcc instruction and <label> to pertain to a loop of instructions, and transmits them to the instruction buffer controller 16. However, when <label> is located behind the SCBcc instruction, the instruction loop recognizer 14 monitors the instruction address register 15. When the instruction address leaves the instruction loop, the recognizer 14 determines the completion of the loop of instructions and notifies the instruction buffer controller 16.

For buffer control using a replacement algorithm of FIFO during a processing outside the loop of instructions, the instruction buffer controller 16 is provided with an address correspondence table (see FIG. 2) corresponding to each of the blocks in the instruction buffer 17. The buffer controller searches a main memory address field 41 in the address correspondence table to find which block in the instruction buffer 17 stores the instruction to be fetched. The instruction buffer address register 18 holds that address in the instruction buffer 17 which indicates the location for storing the next instruction to be fetched. When the address of a required instruction does not exist in the main memory address field 41, the instruction is fetched from the main memory 2 and is stored in a region of the instruction buffer 17 designated by the address that is held by the instruction buffer address register 18. Thereafter, the value of the instruction buffer address register 18 is incremented.

When the address correspondence table is searched after the loop of instructions is recognized by the instruction loop recognizer 14, the lock flag in the lock flag field 42 of the address correspondence table that corresponds to a block where the instruction to be executed is stored, indicates that the instruction to be executed is not replaced until it leaves the loop of instructions. The lock flag is set in each of the blocks until the locked instruction reaches a predetermined rate (e.g., 80%) of the capacity of the instruction buffer 17. When the instruction buffer 17 does not contain the instruction to be fetched, the scanning is effected successively from a place indicated by the instruction buffer address register 18, and the instruction is stored in a block where the lock flag is not set. Even when the instructions 3 constructing the loop of instructions on the main memory 2 of FIG. 1 is greater than the capacity of the instruction buffer 17, the instructions 33 of a predetermined amount on the main memory 2 are necessarily stored as locked instructions 34 on the instruction buffer, and the remaining instructions 31 that are not locked are successively replaced for a remaining portion 32 of the instruction buffer 17 by the FIFO algorithm. When the instruction loop recognizer 14 recognizes the escapement from the loop of instructions, the lock flags are all erased and the algorithm returns to the ordinary FIFO algorithm.

In the case of the multiple loop, the innermost loop is locked. That is, when the SCBcc instruction is recognized in the loop of instructions, the instructions in the loop are all unlocked and the lock processing is started for the loop of new SCBcc instructions.

FIG. 3 is a flow chart showing the procedure of processing related to the instruction fetching by the instruction buffer controller 16. The address correspondence table is consulted (block 51) to examine if the instruction to be fetched exists in the instruction buffer 17. When the instruction to be fetched exists in the instruction buffer 17, then the instruction is fetched (block 52). When the instruction to be fetched does not exist in the instruction buffer 17, it is examined if the instruction exists in the loop of instructions (block 53). When the instruction exists in the loop of instructions, the unlocked instruction in the instruction buffer 17 is replaced with the instruction fetched from the main memory 2 (block 54). When the instruction does not exist in the loop of instructions, the instruction is fetched into the instruction buffer 17 according to the ordinary FIFO algorithm (block 55).

Figure 4:
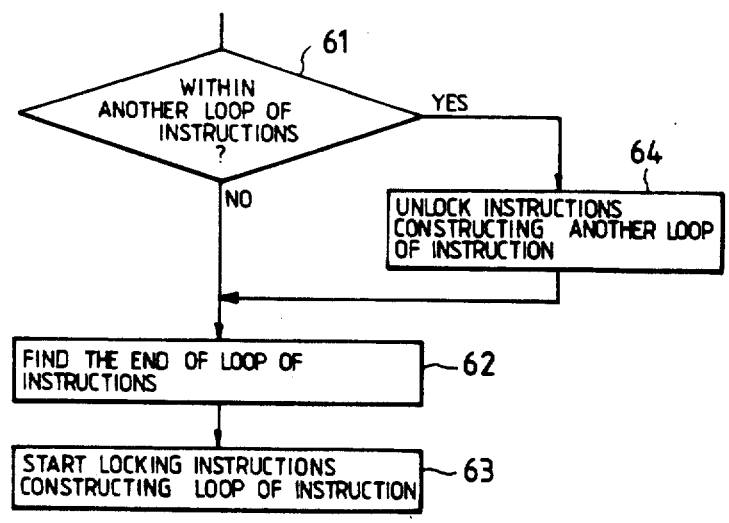
FIG. 4 is a flow chart showing the procedure of processing by the instruction buffer controller when the loop of instructions is recognized.

FIG. 4 is a flow chart illustrating the processing procedure of the instruction buffer controller 16 in the case where the SCBcc instruction is recognized by the instruction loop recognizer 14. First, it is examined whether the instruction to be fetched exists in the loop of SCBcc instructions (block 61). When it does not exist in the loop of SCBcc instructions, the section between the SCBcc instruction and the destination of a jump is regarded to be a range of loop of instructions (block 62), and a lock flag is set for the subsequent instruction fetches (block 63). When the instruction exists in a loop of other SCBcc instructions, lock flags of the address correspondence table are all erased (block 64) in order to unlock the instructions in the loop, and the processing is effected for a new loop of instructions (blocks 62 and 63).

According to the present invention, the hit rate of 100% is maintained like in the prior art when the size of loop of instructions is smaller than the capacity of the instruction buffer, and a high hit rate is maintained even when the size of loop of instructions is greater than the capacity of the instruction buffer. When 80% of the blocks are to be locked in the instruction buffer, the hit rate of block unit of a simple loop of instructions without branches is $0.8/K$ provided the size of loop of instructions is K times ($K \geq 1$) as great as the capacity of the instruction buffer. When, for example, $K=1.1$, the hit rate becomes 0.73. According to the FIFO algorithm of the prior art, the hit rate per block is 0. Therefore, the present invention makes it possible to obtain a high hit rate compared with that of the prior art.

When there is a subroutine call in the loop of instructions and control once leaves the loop, the loop of instructions is not captured and the processing is carried out maintaining the same hit rate as that of the conventional art.

What is claimed is:

1. An information processor connected to a main memory for storing instructions, comprising:
    a buffer memory connected to said main memory for storing a part of said instructions stored in said main memory;
    an execution unit connected to said buffer memory for executing said part of instructions stored in said main memory;
    a buffer controller connected to said buffer memory and said execution unit, including:
        recognizing means connected to said execution unit for recognizing particular instruction words forming a loop of instructions and estimating the loop of instructions by using the instruction words, said recognizing means further recognizing a result that the loop of instructions are to be executed repeatedly by said execution unit and comprise a range greater than a size of said buffer memory;

dividing means connected to said recognizing means and said buffer memory for dividing said buffer memory into a first portion and a second portion, responsive to the recognizing means; and, control means connected to said recognizing means, said dividing means and said buffer memory, for controlling said first portion so that said first portion locks against replacement a first part of the instructions in said loop recognized by said recognizing means during the execution of said loop by said execution unit, and for controlling said second portion so that said second portion stores a second part of the instructions in said loop exclusive of said instructions stored in said first portion.

2. The information processor according to claim 1, wherein said execution unit executes an instruction for forming the loop of instructions, and said recognizing means recognizes the instruction forming said loop, existence of said loop and the range of said loop of instructions, responsive to an execution result of said instruction by said execution unit.

3. The information processor according to claim 1, wherein said control means further comprises means for detecting whether a one instruction in said loop of instructions to be executed is stored in said buffer memory.

4. The information processor according to claim 4, wherein said second portion comprises a remainder of said buffer memory.

5. The information processor according to claim 1, wherein said control means uses a flag distinguishing said first portion and said second portion from each other.

* * * * *